April 6, 1954 — J. W. STEWART — 2,674,057
FISHING ROD AND REEL
Filed March 10, 1950 — 2 Sheets-Sheet 1
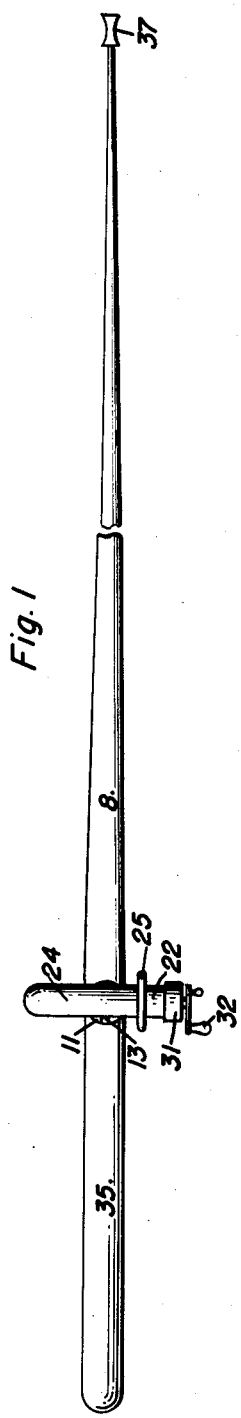
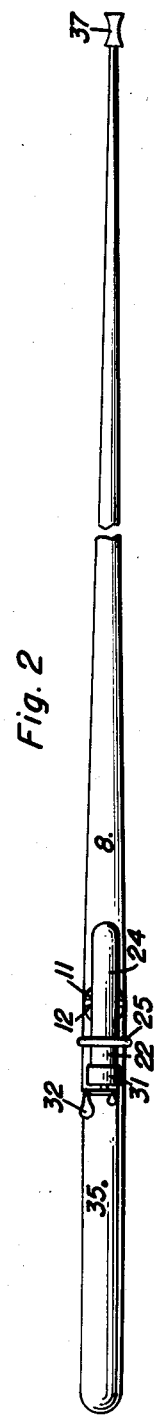
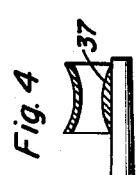
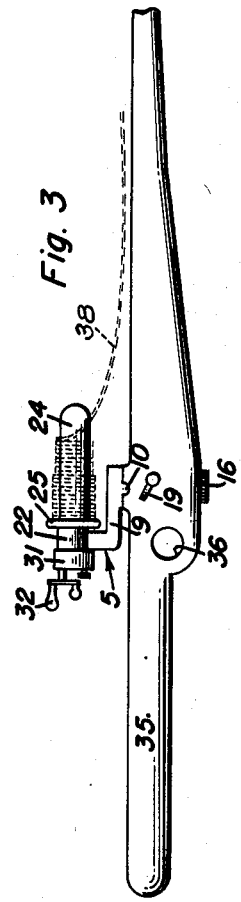
Jerry W. Stewart
INVENTOR.

April 6, 1954 J. W. STEWART 2,674,057
FISHING ROD AND REEL
Filed March 10, 1950 2 Sheets-Sheet 2
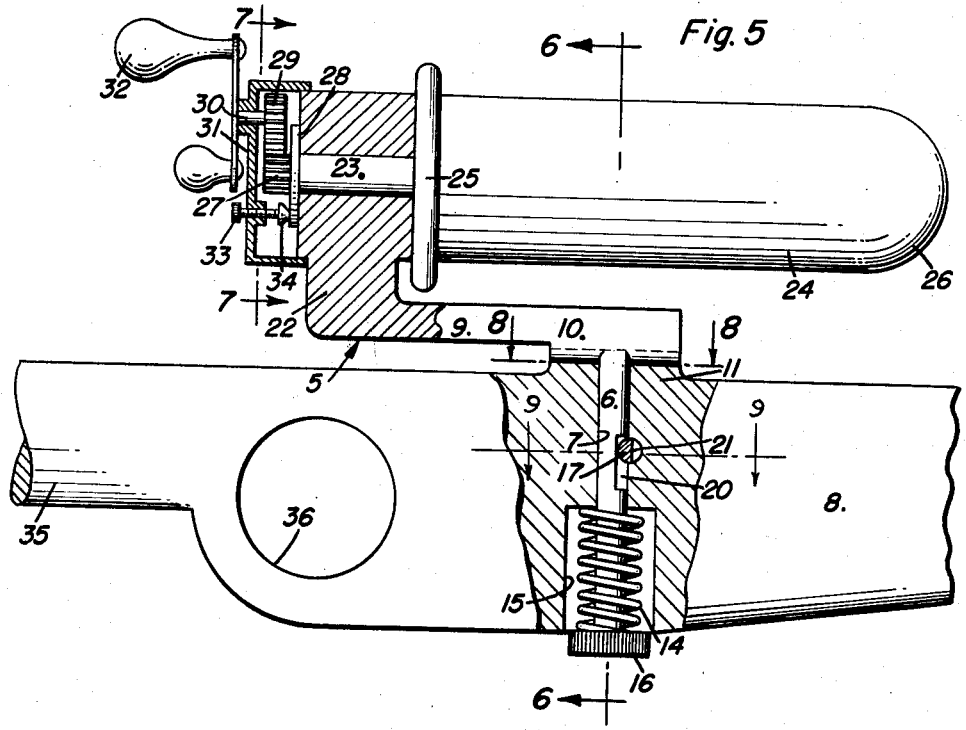
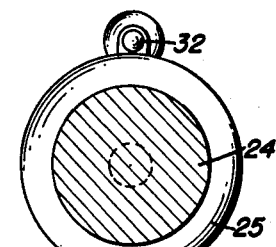
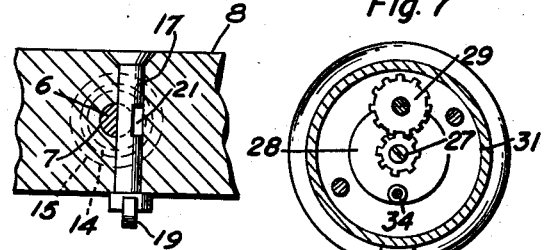
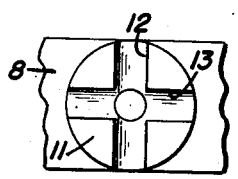
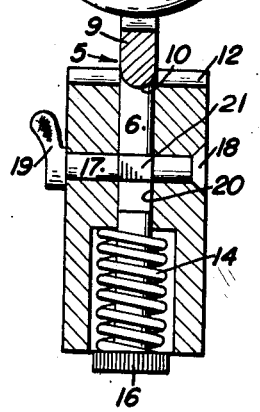
Jerry W. Stewart
INVENTOR.
BY *Clarence A. O'Brien*
*and Harvey B. Jacobson*
Attorneys Patented Apr. 6, 1954

2,674,057

UNITED STATES PATENT OFFICE 2,674,057

FISHING ROD AND REEL

Jerry W. Stewart, Muskegon, Mich.

Application March 10, 1950, Serial No. 148,887

1 Claim. (Cl. 43—20)

The present invention relates to new and useful improvements in fishing rods and reels and more particularly to a novel reel construction and swivel mounting therefor to facilitate and improve the casting and rewinding action of the reel.

An important object of the invention is to provide a swivel mounting for the reel to swing the spool of the reel horizontally to position its axis longitudinally of the rod when casting and to position its axis transversely of the rod when rewinding and constructing the spool with an unobstructed end which is positioned forwardly when casting to facilitate paying out of the line.

Another object is to provide means for yieldingly locking the mounting in either position in the fishing rod.

A further object is to provide a novel reel construction wherein the need for the usual clutch mechanism for the free running of the spool when casting is eliminated to thus materially reduce the cost of manufacture of the reel.

A still further object is to provide a novel fishing rod construction designed for convenient handling with the reel.

Another object is to provide a fishing rod and reel of simple and practical construction, which is neat and attractive in appearance, efficient and reliable in operation, and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figure 1 is a top plan view showing the reel in position on the fishing rod ready for rewinding;

Figure 2 is a similar view with the reel turned into position for casting;

Figure 3 is a fragmentary side elevational view with the reel in casting position;

Figure 4 is an enlarged longitudinal sectional view of the front line guide on the rod;

Figure 5 is an enlarged side elevational view of the reel in casting position and with parts shown in section;

Figures 6 and 7 are vertical sectional views taken on lines 6—6 and 7—7 respectively of Figure 5;

Figure 8 is a sectional view taken on a line 8—8 of Figure 5 showing the locking grooves in the rod for the swingable reel mounting, and Figure 9 is a fragmentary view in horizontal section taken on the line 9—9 of Figure 5.

Referring now to the drawings in detail, wherein for the purpose of illustration I have disclosed a preferred embodiment of my invention, the numeral 5 designates a reel mounting generally and which includes a vertical shaft 6 journalled in a vertical bore 7 in a fishing rod 8. Shaft 6 projects downwardly from an arm 9 formed at one end with a longitudinal rib 10 at its underside and with the shaft 6 at the center of the rib.

The upper edge of rod 8 is formed with a circular boss 11 having intersecting longitudinal and transverse grooves 12 and 13 in which rib 10 is selectively seated by turning shaft 6 in the rod.

Rib 10 is held in one of the grooves by a coil spring 14 in a recess 15 in the lower edge of rod 8 and tensionally bearing against a knob 16 at the lower end of shaft 6 to urge the shaft downwardly. The shaft 6 is capable of being locked against movement in a horizontal plane when rib 10 is in the longitudinal groove 13 by a transverse pin 17 rotatably positioned in rod 8 and intersecting bore 7, the pin having a bevelled head 18 at one end countersunk in one side of the fishing rod and a handle 19 secured to the other end of the pin to rotate the pin. Shaft 6 is formed with a flat bottom recess 20 in which a rounded portion of the pin 17 is adapted to be positioned and the pin is formed with a flattened recess 21 adjacent its rounded portion and in which the rounded portion of the shaft 6 adjacent the recess 20 is adapted to frictionally fit.

A bearing 22 is formed at the other end of arm 9 in an upwardly projecting position and in which a shaft 23 at one end of a horizontal spool 24 is journaled. The spool is formed adjacent shaft 23 with a flange 25 which bears against one side of bearing 22 and its other end is free and rounded, as shown at 26. A pinion 27 is secured to the outer end of shaft 23 and a washer 28 is also secured to the shaft between pinion 27 and bearing 22 to hold the spool from end play.

Pinion 27 is engaged by a gear 29 on a shaft 30 journalled in a gear housing 31 secured to bearing 22 and a handle 32 is secured to the outer end of shaft 30.

A screw 33 is threaded in housing 31 with a head 34 on the inner end of the screw and positioned in wiping contact with washer 28 to function as a brake or drag to regulate the free running of spool 24.

A handle 35 is formed at the rear end of fishing rod 8 and a thumb hold 36 is formed transversely in the rod at the front end of the handle and adjacent reel mounting 5. A tubular line guide 37 is secured to the outer end of rod 8 and is tapered at each end to facilitate passing of a bobber stop bead (not shown) therethrough.

In the operation of the device, shaft 6 is placed in bore 7 of fishing rod 8, whereby arm 9 of reel mounting 5 may swing horizontally to position spool 24 either longitudinally of the rod to facilitate paying out of a line 38 when casting the bait and wherein the line is pulled off the end of the spool while the spool remains stationary, or the spool may be positioned transversely of the rod for winding in the line by handle 32.

The spool 24 and shaft 6 are yieldingly held locked in either position against rotation by the rib or tongue 10 held in the grooves 12 or 13 by the spring 14. Locking pin 17 may be turned to position the rounded side of the pin in the recess 20 against the flat bottom of said recess to lock the shaft against turning when the spool is in longitudinal position. The pin 17 may also be turned so that the rounded side of the shaft 6 adjacent the recess 20 is accommodated in the recess 21 of said pin 17 to unlock the shaft 6 for turning back into transverse position. When the cast is made with the spool 24 in transverse position to the rod 8, and the shaft 6 is unlocked by the pin 17, the pull of the line will cause the spool 24 to turn into longitudinal position relative to the rod 8 and be positioned to snap into such position under the urge of the spring 14. After the cast, the spool 24 may be turned to snap back into transverse position under the urge of said spring 14. During the cast, the shaft 6 may be locked by the pin 17 in a manner described to hold the spool in longitudinal position.

In view of the foregoing description taken in conjunction with the accompanying drawings it is believed that a clear understanding of the device will be quite apparent to those skilled in this art. A more detailed description is accordingly deemed unnecessary.

It is to be understood, however, that even though there is herein shown and described a preferred embodiment of the invention the same is susceptible to certain changes fully comprehended by the spirit of the invention as herein described and the scope of the appended claim.

Having described the invention, what is claimed as new is:

In combination, a fishing rod having a vertical bore, a reel, a mounting for said reel including a shaft rotatable in said bore for swinging of said reel to position the same in longitudinal or transverse positions relative to said rod, said shaft having a flat bottom longitudinal recess in one side thereof and a rounded portion adjacent said recess, and a pin extending through the rod transversely of said shaft and provided with a rounded portion and a recess accommodating the rounded portion of the shaft with a friction fit, said pin being rotatable to position its rounded portion in the recess in the shaft for co-action with the flat bottom of the last-named recess to prevent said shaft from rotating in the longitudinal position of the reel, said pin being also rotatable to permit the rounded portion of the shaft to enter into the recess of the pin to unlock the shaft for rotation to the transverse position of the reel.

References Cited in the file of this patent

UNITED STATES PATENTS

| Number | Name | Date |
|---|---|---|
| 1,059,847 | Duffy | Apr. 22, 1913 |
| 1,607,285 | Krimblebine | Nov. 16, 1926 |
| 1,703,059 | Carpenter | Feb. 19, 1929 |
| 1,954,049 | Jeffery | Apr. 10, 1934 |
| 1,984,272 | Krohn | Dec. 11, 1934 |
| 1,991,407 | Miller | Feb. 19, 1935 |
| 2,083,689 | Clifford | June 15, 1939 |
| 2,152,385 | Mayer | Mar. 28, 1939 |
| 2,522,624 | Lochen | Sept. 19, 1950 |